United States Patent
Anton et al.

(10) Patent No.: US 7,051,618 B2
(45) Date of Patent: May 30, 2006

(54) ULTRASONIC WELDED HINGE DAMPER

(75) Inventors: Jamison J. Anton, Crete, IL (US); Kenneth R. Levey, West Chicago, IL (US); Steven L. Bivens, Kankakee, IL (US); David A. Doornbos, Manteno, IL (US); Joseph J. Bella, Plainfield, IL (US)

(73) Assignee: Illnois Tool Works Inc, Glenview, IL (US)

( * ) Notice: Subject to any disclaimer, the term of this patent is extended or adjusted under 35 U.S.C. 154(b) by 217 days.

(21) Appl. No.: 10/655,560

(22) Filed: Sep. 4, 2003

(65) Prior Publication Data

US 2004/0103746 A1 Jun. 3, 2004

Related U.S. Application Data

(60) Provisional application No. 60/417,952, filed on Oct. 15, 2002.

(51) Int. Cl.
*F16F 15/16* (2006.01)

(52) U.S. Cl. ........................................ 74/574
(58) Field of Classification Search ............... 74/574; 188/290, 316, 306, 272; 16/54, 50; 4/236, 4/248

See application file for complete search history.

(56) References Cited

U.S. PATENT DOCUMENTS

| 1,435,053 A | 11/1922 | Derihon | |
|---|---|---|---|
| 4,691,811 A | 9/1987 | Arakawa et al. | 188/290 |
| 5,152,189 A * | 10/1992 | Miura et al. | 74/573 F |
| 5,255,396 A | 10/1993 | Miyahara et al. | 4/246.2 |
| 5,390,770 A | 2/1995 | Miyahara et al. | 188/307 |
| 5,697,122 A | 12/1997 | Okabe et al. | 16/82 |
| 5,720,370 A | 2/1998 | Takahashi | 188/310 |
| 6,213,881 B1 * | 4/2001 | Sasa et al. | 464/24 |
| 6,298,960 B1 | 10/2001 | Derr | 188/290 |
| 6,464,052 B1 * | 10/2002 | Hsiao | 188/290 |
| 6,634,033 B1 * | 10/2003 | Mizuno et al. | 4/248 |
| 6,725,984 B1 * | 4/2004 | Orita | 188/290 |
| 6,840,355 B1 * | 1/2005 | Iwashita | 188/290 |

FOREIGN PATENT DOCUMENTS

| DE | 202 05 905 U1 | 11/2002 |
|---|---|---|
| EP | 0 529 313 A2 | 3/1993 |
| EP | 0 697 541 A1 | 2/1996 |
| EP | 0 742 381 A2 | 11/1996 |
| GB | 178037 | 4/1922 |
| JP | 63231029 | 9/1988 |

OTHER PUBLICATIONS

EP 03 25 6285 Search Report dated Mar. 11, 2004.

* cited by examiner

*Primary Examiner*—Vicky A. Johnson
(74) *Attorney, Agent, or Firm*—Mark W. Croll; Paul F. Donovan

(57) ABSTRACT

A damper includes a housing, a cover, a rotor and a valve relatively rotatable with respect to the rotor. When rotated in one direction, a space between the valve and the rotor is opened to increase damper fluid flow and reduce damper resistance. When rotated in an opposite direction, the space between the valve and the rotor is closed to decrease damper fluid flow and increase damper resistance. A shaped flange on the rotor provides a changing space between the rotor and ribs in the housing when the rotor is rotated. The cover is self-centering on the housing.

10 Claims, 4 Drawing Sheets

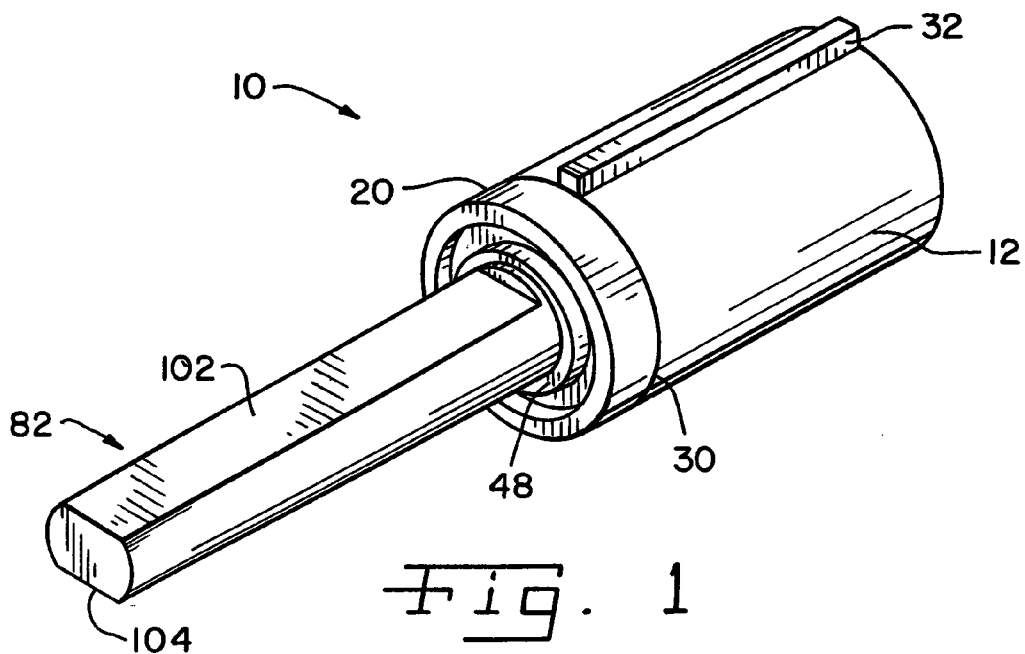
Fig. 1
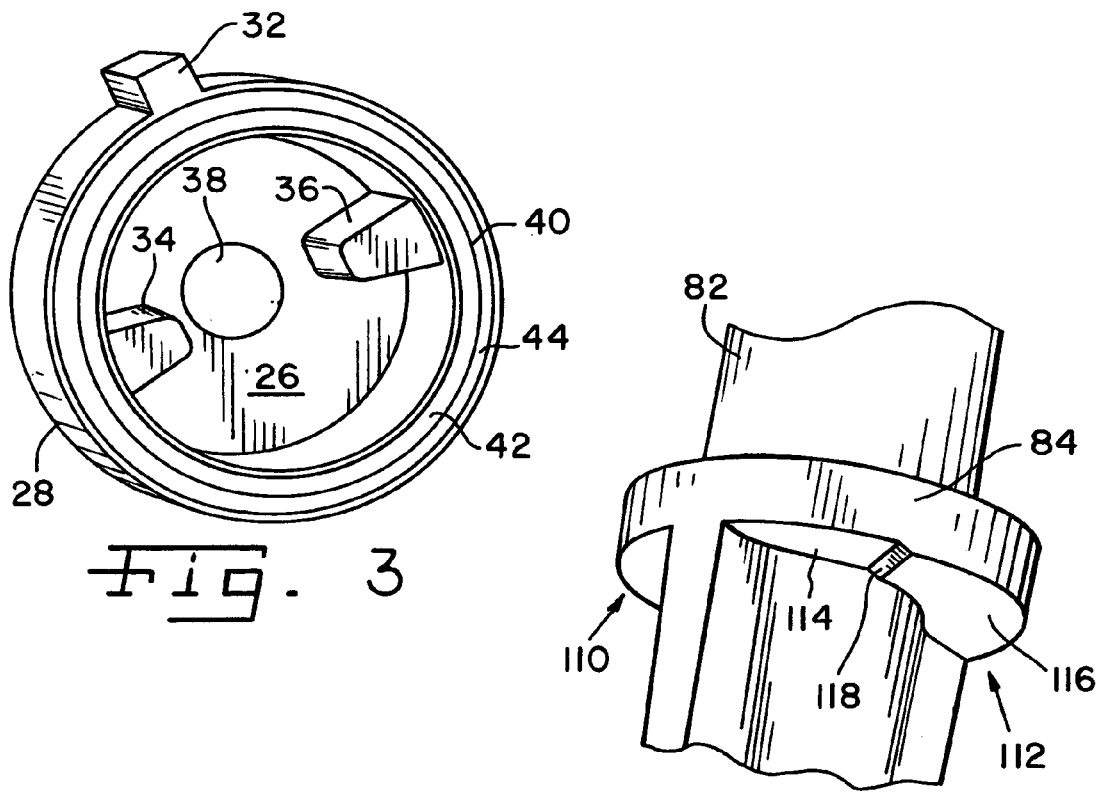
Fig. 3
Fig. 7

ULTRASONIC WELDED HINGE DAMPER

CROSS REFERENCE TO RELATED APPLICATIONS

The present regular application claims benefit to U.S. Provisional Application Ser. No. 60/417,952 filed on Oct. 15, 2002.

FIELD OF THE INVENTION

The present invention relates generally to high-torque movement dampers having a viscous fluid contained in a hermetically sealed chamber, and to structures forming the sealed chamber

BACKGROUND OF THE INVENTION

A variety of assemblies use movement dampers to control the movement of assembly components. For example, in furniture and cabinetry it is known to use dampers for controlling movement of a drawer or door in at least one direction. In automobiles, it is known to use dampers on glovebox and console doors, and the like.

A known damper design provides rotational resistance to a gear, hinge or other rotating component on a mechanism such as an automatic closer through driving engagement between the component of the mechanism and a shaft of the damper. Resistance to rotation of the shaft in the damper is thereby imparted to rotation of the mechanism, for controlling operation of the mechanism. In some assemblies, the torque resistance requirement for the damper is high, and the space available in which to install the damper is small, or at least desirably is small.

Dampers of the type described are known to include a rotor rotatably held in a hermetically sealed housing. A shaft of the rotor projects outwardly from the housing, and may include a gear or other coupling by which the damper is connected to the component for which movement control is required. Resistance to rotation of the rotor is provided by a viscous fluid contained in a chamber within the housing flowing through compartments the volumes of which change as the rotor turns.

For continued, effective operation of the damper, the chamber defined by the housing must be hermetically sealed, to eliminate leakage of the viscous fluid. Any leakage adversely impacts damper performance. In high-torque dampers, assembly must be precise to ensure that performance is consistent from one damper to the next. Even a slight variation in assembly, with only a small deviation from design limits for a space in which the damping fluid flows can have a significant and unacceptable increase or decrease in the torque performance of the damper.

It is known to form the housing from two components, including a first component defining the majority of the chamber for the viscous fluid, and a cover or cap for the housing. The cover defines an opening for the rotor shaft. During assembly of the damper, the viscous fluid is dispensed into the housing. The rotor is positioned in the housing, with the shaft of the rotor extending through the cover. An o-ring seals the opening in the cover around the rotor shaft, and the cover is connected to the housing in a manner intended to seal the connection against leakage of the damper fluid. Surfaces in the housing and in the cover are sealed against each other, to seal the chamber.

Known techniques for connecting the housing and cover include snap fits and ultrasonic welding. Snap fit components are relatively wide, and compress a thick seal therebetween. Frictional resistance to assembly is high, and snap fits provide less consistency in hermetic seal formation between the housing and cover. Failures occur if the components are not pressed together adequately.

Known ultrasonic welding techniques use a tongue-and-groove relationship between the cover and housing. The housing and cover are required to be wide to accommodate the tongue and groove structures, and only a single energy director is provided. As a result, welding can be somewhat unreliable and inconsistent. Resulting damper torque performance can vary from one damper to another due to the inability to reliably control weld depth, and the dimensional distortion that can occur in the assembly. As a result, ultrasonically welded joints often also incorporate compressed seals at the joint to prevent leakage. This further increases damper size and cost.

Compact dampers requiring minimal space are desirable. In some assemblies, it is further desirable that resistance or "damping" be greater in one rotational direction of the rotor than in the opposite rotational direction.

What is needed in the art is a damper that is easier and less costly to assemble, more reliable and consistent in operation than are known designs, and provides different resistance to rotation in one direction than in the opposite direction.

SUMMARY OF THE INVENTION

The present invention provides a high torque damper with internal flow ports that are opened and closed during use to provide different torque performance, and a housing and cover secured to each other by ultrasonic welding at a specially configured joint that promotes proper alignment and adequate sealing.

The invention provides, in one form thereof, a viscous damper with first and second components defining an enclosed chamber for holding damping fluid. A rotor has a first portion rotationally disposed in the chamber and a second portion extending outwardly from the chamber. A valve is disposed in the chamber for relative rotation with respect to the rotor. The rotor and the valve each have at least one valve face complementary to each other. The faces are adapted for engaging each other and substantially closing a space therebetween when the rotor is rotated in a first direction and for relative rotation with respect to each other for opening a space therebetween when the rotor is rotated in a second direction.

The invention provides, in another form thereof, a damper with a housing having an opening; a cover over the opening; and a rotor rotatably disposed in the housing. The rotor extends outwardly of the housing through the cover. The cover and the housing define a mutually engaging structure including a v-shaped channel in one of the cover and the housing and a rectangular ring in the other of the housing and the cover. Walls define the channel, and the ring includes opposed edges received against the walls.

In a further form thereof, the invention provides a method for assembling a damper with steps of providing a damper housing defining a chamber with an opening, the housing defining a v-shaped channel at an end thereof; providing a cover for the opening, the cover having an annular ring rectangular in cross-section; providing a rotor having a first portion for rotation in the chamber and a second portion for extending outwardly of the housing; providing a fluid seal on the rotor; placing the first portion of the rotor in the chamber; sliding the cover onto the second portion of the rotor and positioning the cover against the seal and against the housing; centering the ring in the channel, with edges of the ring against walls of the channel; and welding the cover to the housing along substantially continuous beads defined at the contact between edges of the ring and walls of the channel.

An advantage of the present invention is providing a viscous damper that is easily and consistently assembled.

Another advantage of the present invention is providing a viscous damper that is reliable and sturdy, and that has tightened torque tolerances compared with known dampers.

A still further advantage of the present invention is providing an assembly process for viscous dampers that is easy to perform, reduces scrap and produces dampers that perform consistently.

Yet another advantage of the present invention is providing a high torque damper with different torque performance in one direction than in another.

A yet further advantage of the present invention is providing a viscous damper having components that are easy to design and mold from thermoplastic materials.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a perspective view of a damper in accordance with the present invention;

FIG. 3 is an end view of the housing of the damper;

FIG. 7 is an enlarged view of a collar portion of the rotor in the damper; and

Figure 2:
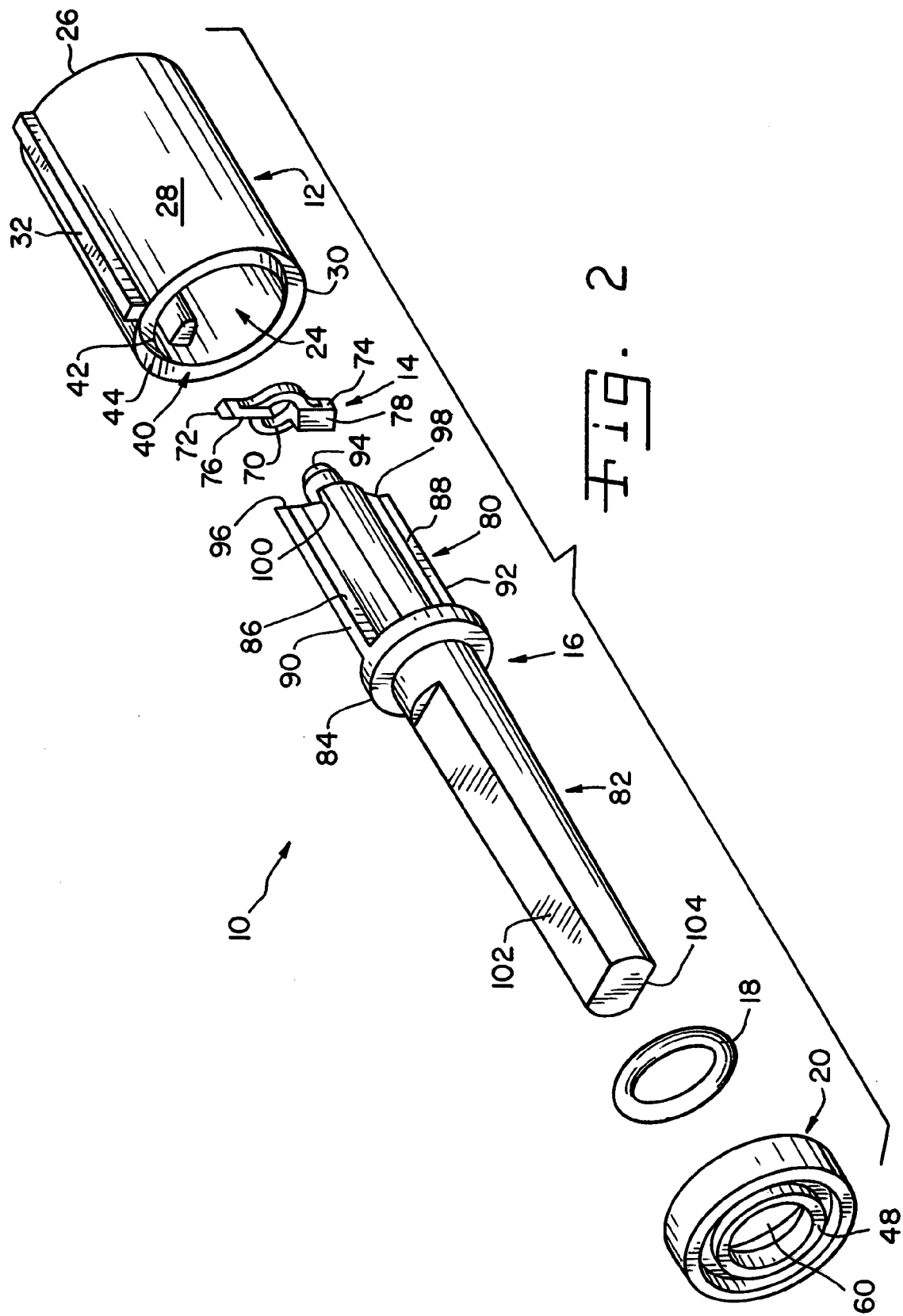
FIG. 2 is an exploded, perspective view of the damper shown in FIG. 1.

Before the embodiments of the invention are explained in detail, it is to be understood that the invention is not limited in its application to the details of construction and the arrangements of the components set forth in the following description, or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising", and variations thereof, is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, numeral 10 designates a damper of the present invention, which can be used for controlling the movement of a device (not shown), which maybe a drawer, a door or the like in appliances, furniture, automobiles or other devices.

It is anticipated that damper 10 of the present invention will have a wide range of uses and applications, and should not be interpreted as being limited to the few applications and uses provided as examples herein. Also, the use herein of terms such as "bottom", "top", etc. are only for purposes of description with respect to the orientation shown in the drawings. Damper 10 can be used in a variety of orientations including those in which such components are above others.

As best seen in the exploded view of FIG. 2, damper 10 includes a housing 12, a valve 14, a rotor 16, an o-ring 18 and a cover 20. A damping fluid is contained within damper 10, as well known to those skilled in the art. An indication of one flow stream of damping fluid within damper 10, to be described hereinafter, is indicated by arrow 22 in FIG. 6.

Housing 12 defines a chamber 24 having a closed base or first end 26, a substantially cylindrical side 28 and an open second end 30 opposite first end 26. Cover 20 is provided as a closure for open second end 30 of housing 12. Housing 12 and cover 20 thereby are first and second components defining an enclosed volume therebetween for chamber 24. One or more tabs or fixtures 32 can be provided on housing 12, one such fixture 32 being shown in the drawings. Fixture or fixtures 32 are provided for securing housing 12 in a device (not shown). Those skilled in the art will understand readily that other structures, devices and attaching systems can be used.

Housing 12 further includes internal ribs 34 and 36 (FIG. 3) extending inwardly in chamber 24 from cylindrical side 28. Ribs 34 and 36 are directly opposite and spaced from each other in chamber 24 and are joined to an inner surface of base 26, which further defines a depression 38 therein. Second end 30 of cylindrical side 28 forms a v-shaped channel 40 (FIG. 8) defined by inner and outer channel walls 42 and 44, respectively.

Figure 4:
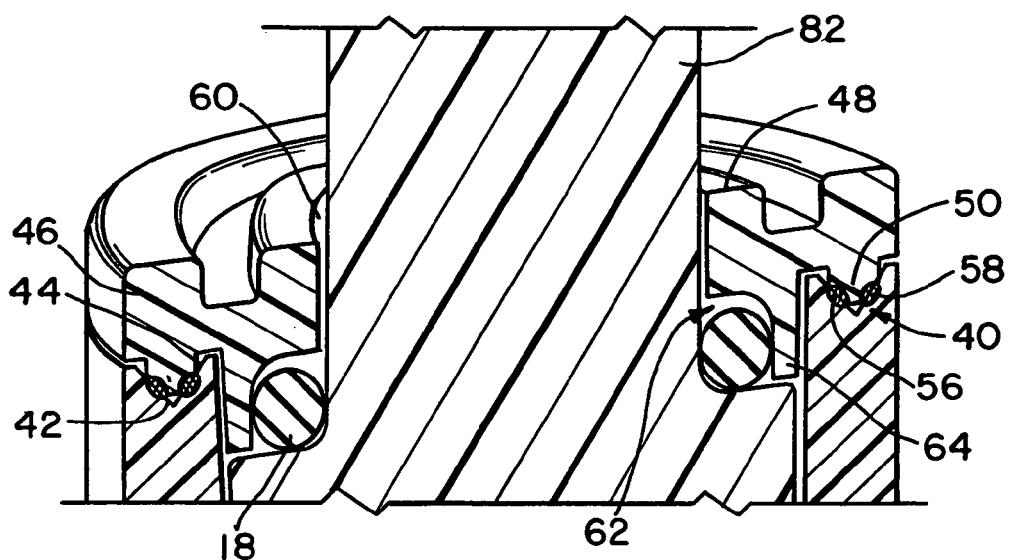
FIG. 4 is a cross-sectional view of the damper, showing the welded joint between the cover and housing.
Figure 8:
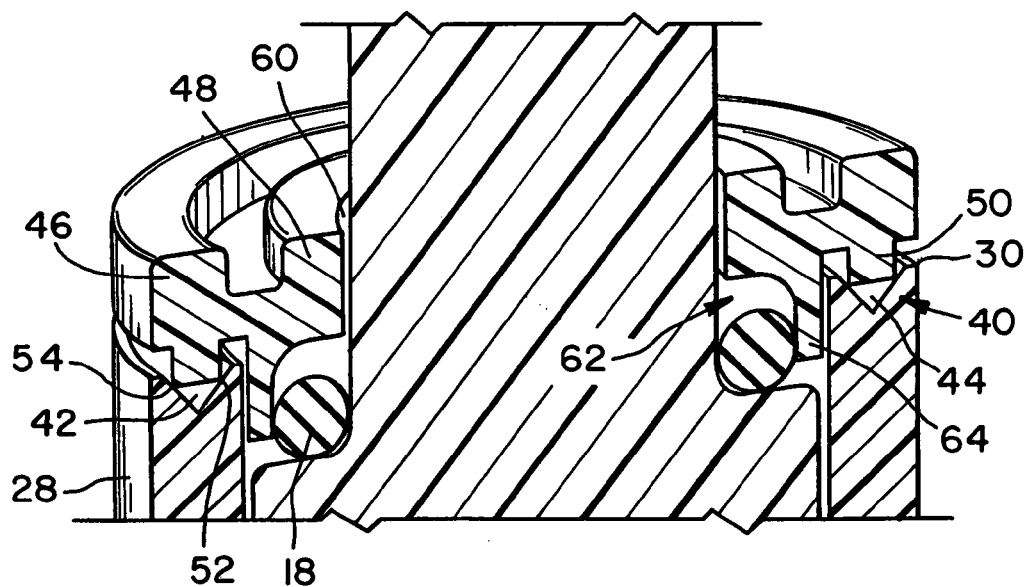
FIG. 8 is a cross-sectional view similar to FIG. 4 but illustrating the cover and housing at an intermediate stage of assembly, before the cover is welded to the housing.

Cover 20 defines an annular outer rim 46 and a central dome 48. Rim 46 defines a ring 50 on the side of cover 20 that faces housing 12 (FIGS. 4 and 8).

Ring 50 is substantially rectangular in cross-section, and is adapted, arranged and sized to be received in v-shaped channel 40 of cylindrical side 28. Opposite edges 52 and 54 of ring 50 contact channel walls 42 and 44, respectively, and function as energy directors for ultrasonic welding of cover 20 to housing 12 along two circular and continuous beads 56 and 58 shown in FIG. 4. Alternatively, although not shown, ring 50 and channel 40 (or walls 42 and 44) could be made flat so as to allow the cover 20 to be laser welded to the housing 12.

Central dome 48 of cover 20 surrounds a central opening or hole 60 in cover 20 and provides a bowl-like interior region 62. A flange 64 on the inner side of cover 20 inwardly from ring 50 extends along a portion of side 28 in the assembled damper 10. Rotor 16, to be described in more detail hereinafter, is disposed within chamber 24 and extends outwardly from housing 12 and cover 20, through hole 60. O-ring 18 is disposed and seated on rotor 16, and is further seated against cover 20 in bowl-like interior region 62 of cover 60 to provide a seal against leakage of damping fluid from chamber 24.

Valve 14 (FIG. 2) includes a substantially annular base 70 and substantially diametrically disposed, outwardly extending wings 72 and 74 defining angular valve faces 76 and 78, respectively.

Rotor 16 is disposed partially within chamber 24, and is rotatable about its own longitudinal axis. Rotor 16 includes a first portion 80 substantially contained within chamber 24, and a second portion 82 extending outwardly from housing 12, through hole 60 in cover 20. Rotation of rotor 16 in chamber 24 is retarded or inhibited by operation of the damping fluid in chamber 24. As those skilled in the art will understand readily, the damping fluid flow within chamber 24 determines the torque performance of damper 10, and the viscosity of the fluid and the gap between components of rotor 16, valve 14 and chamber 24 influence damping fluid flow.

Advantageously, rotor 16 is formed as a one-piece, monolithic structure including first portion 80 and second portion 82. A flange 84 or other ledge-like configuration is provided at the transition from first portion 80 to second portion 82. O-ring 18 is disposed around second portion 82, substantially on flange 84 and within bowl-like region 62. In the assembled damper 10, o-ring 18 provides a fluid-tight seal against both rotor 16 and cover 20 so that damping fluid is contained within chamber 24 and does not leak from hole 60.

First portion 80 is cooperatively shaped in association with chamber 24 and valve 14 to experience the desired damping effect to the rotation thereof from the resistance provided from the fluid contained and flowing in chamber 24 as rotor 16 rotates. The associated relationship between rotor 16 and valve 14 creates greater rotational resistance in one direction of rotation than in the other direction of rotation, as will be described.

First portion 80 fits closely within chamber 24, and may be of different configurations to achieve the desired damping effect. As shown, first portion 80 includes opposed, outwardly extending paddles 86 and 88. Outer edges 90, 92 of paddles 86 and 88 fit closely against or near cylindrical side 28 to control flow of fluid between paddles 86, 88 and housing 12. As used herein, "control" of damping fluid flow is understood to mean limiting the flow to a desired amount as well as effectively eliminating the flow of damping fluid, as desired.

The inner-most end of rotor 16 defines an axially positioned stub shaft or pin 94 that extends through annular base 70 of valve 14 and is received in depression 38 of base 26. Valve 14 and rotor 16 are rotatable relative to each other at pin 94, within physical restrictions. Innermost ends of paddles 86 and 88 define angular valve faces 96, 98 complementary to valve faces 76 and 78 on valve 14. A central abutment 100 is provided to engage wings 72 and 74, thereby limiting the relative rotation of valve 14 and rotor 16.

Second portion 82 is advantageously shaped for connection to the device on which damper 10 is to operate. In the exemplary embodiment, second portion 82 is configured substantially as a shaft projecting from housing 12 in the assembled damper 10, the shaft having flattened sides 102 and 104. However, it should be understood that second portion 82 can be configured in different ways to accommodate connection to the device or thing upon which damper 10 will operate.

In assembly of damper 10, valve 14 and rotor 16 are assembled, with pin 94 extending through annular base 70. Valve faces 76 and 78 of valve 14 are positioned adjacent valve faces 96 and 98 of rotor 16, respectively. Rotor 16 with valve 14 thereon is placed in housing 12, with paddles 86 and 88 positioned between ribs 34 and 36. Pin 94 is positioned in depression 38, and valve 14 rests against bottom 26 of housing 12. Chamber 24 is filled with damping fluid. O-ring 18 and cover 20 are placed over rotor second portion 82, and the assembly is pressed together, compressing o-ring 18 into sealing position. As cover 20 engages housing 12, flange 64 slides into cylindrical side 28 and rectangular ring 50 settles into v-shaped channel 40. With pin 94 held in depression 38, positioning rotor first portion 80 in chamber 24, and rotor second portion 82 held by cover 20 which is positioned by flange 64 in cylindrical side 28 and by ring 50 in v-shaped channel 40, the assembly of damper 10 is substantially self-centering (FIG. 8). Edges 52 and 54 engage channel walls 42 and 44, respectively, and serve as energy directors for ultrasonic welding of cover 20 to housing 12. Beads of weld 56 and 58 are formed along the areas that edges 52 and 54 engage channel walls 42 and 44, to form a strong, fluid tight bond between cover 20 and housing 12. It should be understood that other welding techniques, such as laser welding, also can be used.

Figure 5:
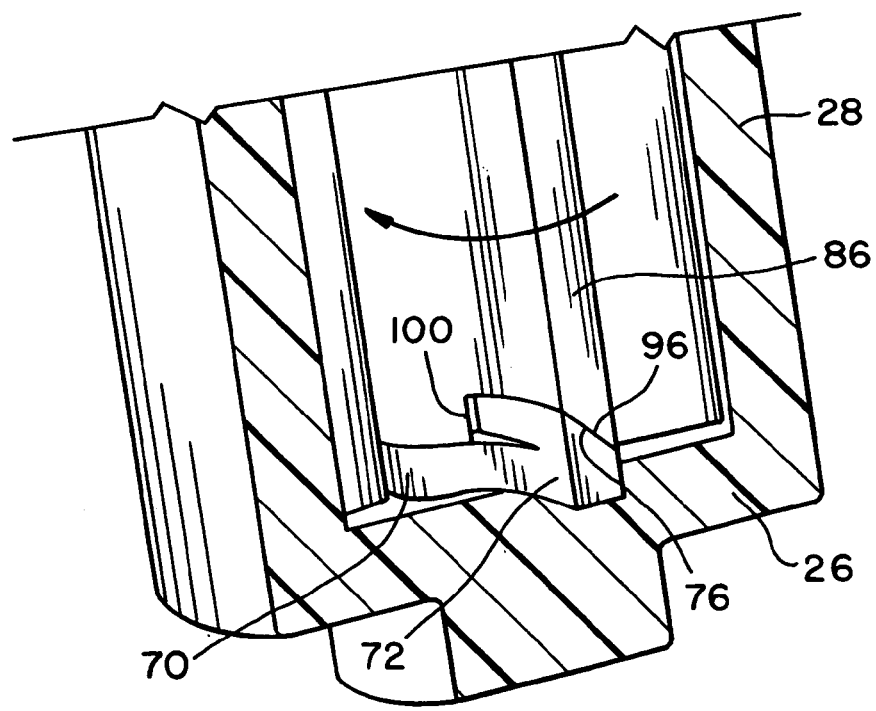
FIG. 5 is a cross-sectional view showing the internal valve of the damper in a closed position.

During use of damper 10, when rotor 16 is rotated in a clockwise direction as shown in FIG. 5, valve faces 76 and 78 of valve 14 seat against valve faces 96 and 98 of rotor 16, respectively. With no opening between valve 14 and rotor 16, damping fluid does not flow between valve 14 and rotor 16. Valve 14 rotates with rotor 16, and wings 72 and 74 function essentially as extensions of paddles 86 and 88. As paddles 86 and 88 sweep through chamber 24, the volumes change in spaces defined on opposite sides thereof between ribs 34, 36 and each paddle 86 and 88. Damping fluid can flow from one space to another only between ribs 34, 36 and rotor 16, or between an inner portion of cylindrical side 28 and outer edges 90 and 92 of paddles 86 and 88. By closely controlling the dimensions of each component, the damping effect created by damper 10 is controlled.

Figure 6:
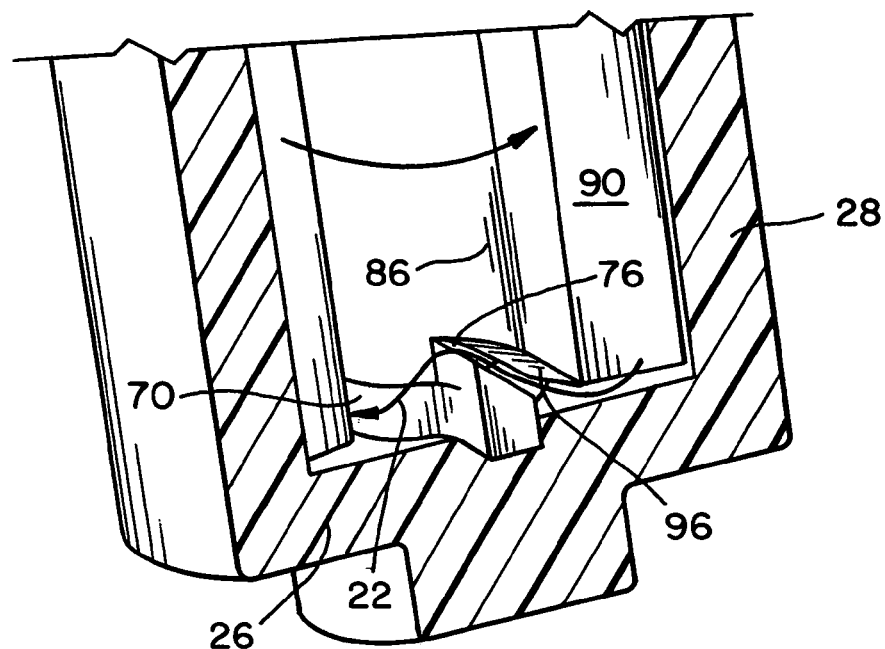
FIG. 6 is a cross-sectional view showing the internal valve of the damper in an opened position.

When rotor 16 is rotated counter-clockwise as shown in FIG. 6, the drag of valve 14 against bottom 26 and the resistance from damping fluid in chamber 24 slow the movement of valve 14 relative to rotor 16. Valve faces 96 and 98 separate from valve faces 76 and 78. The opening between valve 14 and rotor 16 creates additional paths 22 for damping fluid flow as paddles 86 and 88 sweep through chamber 24, changing the volume of spaces defined on opposite sides thereof between ribs 34, 36 and each paddle 86 and 88. The relative rotation between valve 14 and rotor 16, and consequently the size of the opening defining flow paths 22, is limited by one or more abutments 100 engaged by the backs of wings 72 and 74. With the additional flow paths 22 created, the resistance to movement of rotor 16 is less, and damper 10 thereby provides less damping effect when rotor 16 is rotated counter-clockwise then when rotor 16 is rotated clockwise.

The difference in damping effect for rotation in one direction as compared with rotation in the opposite direction can be used advantageously for many devices in which it is desirable to have movement more difficult in one direction then in another. It can be employed advantageously also in devices where the weight of the device provides influence as well. For example, with a door hinged at the top to open upwardly, less damping effect may be desired for opening, when the weight of the door must be lifted, and more damping effect may be needed for closing, when the weight of the door naturally urges the door closed.

FIG. 7 illustrates another embodiment of the invention which provides different damping effects from rotation in opposite directions. Flange 84 has shaped surfaces 110 and 112 on the side thereof facing ribs 34 and 36 in chamber 24. Each surface 110 and 112 includes a more distant surface 114 and a more near surface 116 with respect to ribs 34 and 36. A ramp 118 connects surfaces 114 and 116. Thus, it can be seen that spaces between ribs 34, 36 and surfaces 110, 112 are decreasing and/or closed when rotor 16 is rotated in one direction, and are opened or increasing when rotor 16 is rotated in the opposite direction. Differing paths for the flow of damping fluid are created between surfaces 110, 112 and ribs 34, 36. Those skilled in the art will understand that the features of the embodiment shown in FIG. 7 can be used in place of or in addition to the use of valve 14 as described previously. It is possible to position and shape surfaces 110 and 112 relative to the orientation and operation of valve 14 such that both open and close substantially simultaneously to create an increased torque difference. It also is possible to position and shape surfaces 110 and 112 relative to the orientation and operation of valve 14 such that openings created by each are sequential, providing a stepped change as the damper moves from the greatest damping effect to the least damping effect, and vice-versa.

The present invention provides a high torque viscous damper that is easy to assemble and align properly for consistent performance. Through internal valves, the damper provides greater resistance when rotated in one direction than when rotated in the opposite direction.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A viscous damper comprising:
   first and second components defining an enclosed chamber for holding damping fluid;
   a rotor having a first portion rotationally disposed in said chamber and a second portion extending outwardly from said chamber, said rotor including an outwardly extending paddle;
   a valve disposed in said chamber for relative rotation with respect to said rotor, said valve including a base and an outwardly extending wing, said valve base being annular; and
   said rotor and said valve each having at least one valve face complementary to each other, with said valve face of said valve disposed on said wing and said valve face of said rotor disposed on an end of said paddle adjacent said wing said rotor including a pin extending through said annular base said faces adapted for engaging each other and substantially closing a space therebetween when said rotor is rotated in a first direction and for relative rotation with respect to each other for opening a space therebetween when said rotor is rowed in a second direction.

2. The damper of claim 1, said rotor including an abutment positioned to engage said valve and limit relative rotation between said valve and said rotor.

3. The damper of claim 1, said valve including two said wings and a valve face on each said wing and said rotor including two said paddles and a valve face on each said paddle.

4. The damper of claim 3, said rotor including an abutment positioned to engage said valve and limit relative rotation between said valve and said rotor.

5. The damper of claim 1, said chamber having an inwardly projecting rib and said rotor including a rotor flange above said rib, said rotor flange having an angular inner surface, said rib and said rotor flange defining a space therebetween of varying dimension with relative rotation between said rotor and said housing.

6. The damper of claim 5, said chamber having two said ribs and said rotor including a rotor flange above both said ribs said rotor flange having an angular inner surface above each said rib, said ribs and said rotor flange defining spaces therebetween of varying dimension with relative rotation between said rotor and said housing.

7. A damper comprising:
   a housing having an opening and a substantially cylindrical wall;
   a cover over said opening said cover including a flange slidable into said housing along said cylindrical wall;
   a rotor rotatably disposed in said housing said rotor extending outwardly of said housing through said cover, said rotor including a flange;
   a v-shaped channel disposed in said housing and a ring disposed on said cover, said channel having walls defining said channel, and said ring being rectangular in cross-section and including edges received against said walls; and
   seal positioned on said flange of said rotor between said rotor and said flange of said cover.

8. The damper of claim 7, said cover ultrasonically welded to said housing along said ring edges received against said channel walls.

9. The damper of claim 7, said rotor including an end, and said housing including a base defining a depression, said end of said rotor being disposed in said depression in said base.

10. A viscous damper comprising:
    a housing defining a side wall and an enclosed chamber for holding damping fluid, said housing including ribs extending inwardly in said chamber along said side wall, said ribs being internally formed with said side wall so as to be stationary therewith; and
    a rotor having a first portion rotationally disposed in Mid chamber and a second portion extending outwardly from said chamber, said rotor including a flange having shaped surfaces on a side thereof facing said ribs, each said surface including a more distant surface and a more near surface with respect to said ribs, with a ramp extending between said distant surface and Mid near surface, such that spaces between said ribs and said surfaces decrease or close when said rotor is rotated in one direction and increase or open when said rotor is rotated in an opposite direction.

* * * * *